July 23, 1935.  I. W. ROBERTSON  2,008,772
METHOD OF MAKING OSCILLATING JOINTS
Filed March 11, 1931
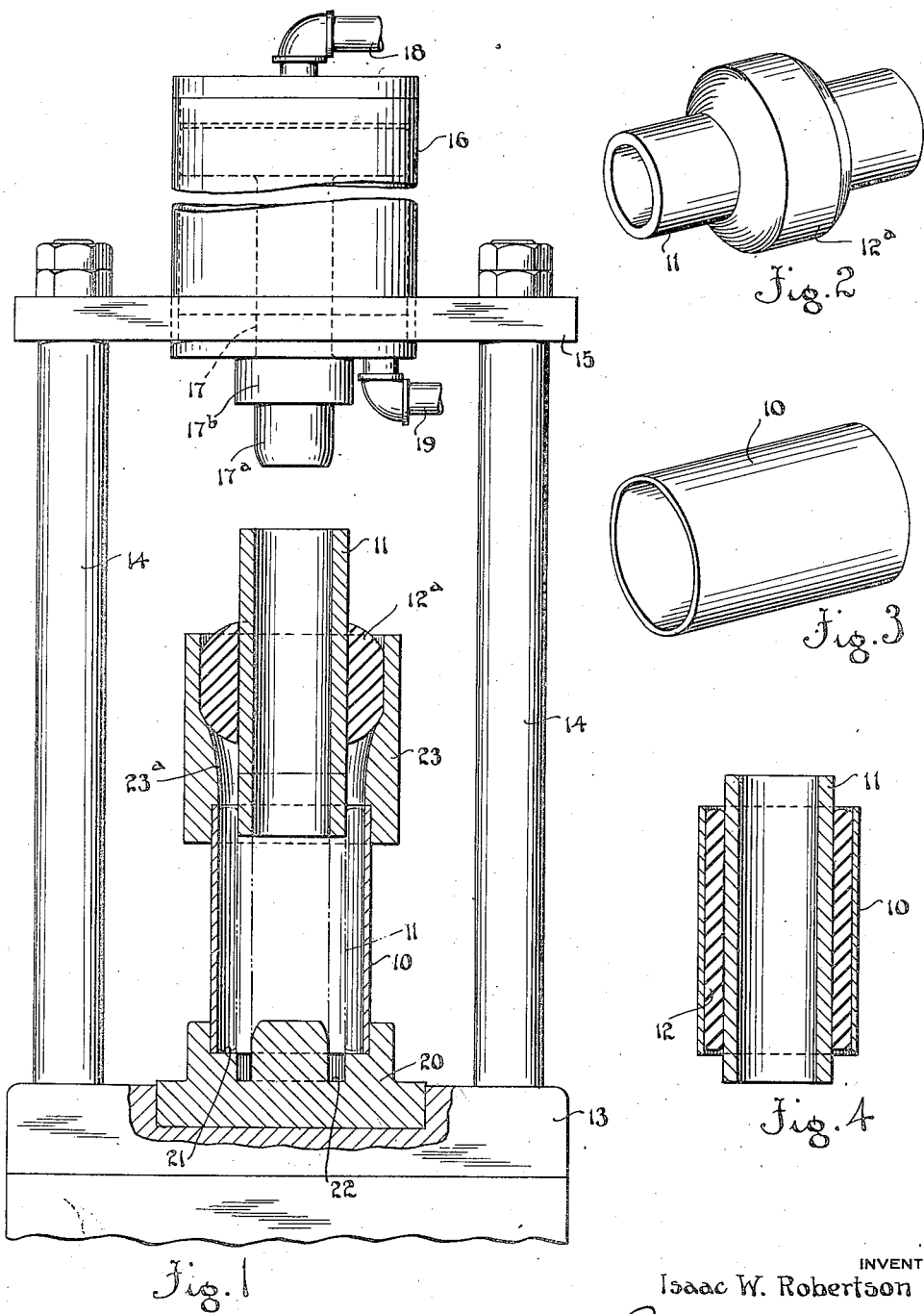
INVENTOR
Isaac W. Robertson Patented July 23, 1935

2,008,772

UNITED STATES PATENT OFFICE 2,008,772

METHOD OF MAKING OSCILLATING JOINTS

Isaac W. Robertson, Akron, Ohio, assignor to The Firestone Tire & Rubber Company, Akron, Ohio, a corporation of Ohio Application March 11, 1931, Serial No. 521,804

7 Claims. (Cl. 29—88.2)

This invention relates to methods of making oscillating joints such as are used, for example, in automobile construction for the joints formed between the springs and shackle bolts, and the joints involved in the steering mechanism, and more especially the invention relates to the manufacture of oscillating joints of the type comprising rubber mounted between concentric sleeves.

In oscillating joints of the character mentioned wherein relative angular movement of the sleeves is resisted by the tension of the rubber, the rubber either has been vulcanized to the respective sleeves, or it has been compressed between the sleeves so as to engage the latter strongly by friction. Vulcanizing the rubber within the sleeves is a difficult and frequently unsatisfactory operation, and where the rubber engages the sleeves solely by friction there is such a difference in area between the rubber-engaging surfaces of the inner and outer sleeves that slippage invariably occurs between the rubber and inner sleeve, and before the sleeves has turned relatively of each other a satisfactory distance.

The chief objects of the invention are to facilitate the assembling of the sleeves and rubber in the manufacture of oscillating joints of the character described; to avoid vulcanizing the rubber at least to one of the sleeves; and to assure substantial relative angular movement of the sleeves before slippage upon the rubber occurs. Other objects will be manifest as the specification proceeds.

Of the accompanying drawing:

Figure 1 is an elevation of apparatus adapted to carry out my improved method, and the work therein, the latter and a part of the apparatus being shown in section;

Figure 2 is a perspective view of the inner sleeve and rubber cushion of the improved joint, as they appear before assembly with the outer sleeve;

Figure 3 is a perspective view of the outer sleeve; and

Figure 4 is a longitudinal section through the finished work.

Referring to Figure 4 of the drawing, the improved oscillating joint comprises a metal outer sleeve 10, a concentric metal inner sleeve 11, and an intervening cushion of elastic rubber 12. The rubber cushion 12 is locally adhesively attached preferably by vulcanization, to the inner sleeve 11 in the central region thereof, as is best shown in Figures 1 and 2, and is under compression so as to exert strong pressure against both the inner and outer sleeves. The inner sleeve 11 as shown is of somewhat greater length than the outer sleeve 10, but the sleeves may be of the same length if desired.

In the manufacture of the joint, a collar of rubber 12a is molded and vulcanized onto the inner sleeve 11, centrally thereof, said rubber collar being of less length than the sleeves 10, 11 and of greater diameter than the inside diameter of the outer sleeve 10 and having convex lateral faces as shown. The sleeve 11 and rubber collar 12a thereon are assembled with the outer sleeve 10 by forcing the sleeve 11 into telescoped relation with the sleeve 10, the rubber collar 12a being thereby carried into the outer sleeve, and so deformed and displaced as to fill completely the space between the inner and outer sleeves, as is most clearly shown in Figure 4.

Suitable apparatus for assembling the members of the joint is shown in Figure 1 wherein 13 is a base, 14, 14 are posts rising therefrom, 15 is a deck or support mounted upon the posts 14, and 16 is a double acting fluid pressure operated cylinder mounted upon the deck 15, the cylinder 16 being vertically positioned and having a piston rod 17 projecting downwardly from its lower end. The cylinder 16 is provided at its opposite ends with fluid-inlet-and-outlet pipes 18, 19, and the lower end of the piston rod 17 is formed with a tapered leader or guide 17a adapted to enter the sleeve 11 at an end thereof, and a collar 17b of larger diameter adapted to overlie said end. A suitable work-seat 20 is mounted upon the base 13, said work-seat being formed with an annular recess 21 that is axially aligned with the piston rod 17 and adapted to receive an end portion of the outer sleeve 10, and having a concentric groove 22 of smaller diameter adapted to receive the leading end portion of the inner sleeve 11 when the latter is fully telescoped with the outer sleeve 10.

A suitable tubular guide 23 is provided for facilitating the forcing of the rubber collar 12a into the outer sleeve 10, said guide being adapted to be mounted upon the upper end of the sleeve 10, and being interiorly formed with a downwardly tapered portion 23a having a large diameter of the same size as the normal diameter of the collar 12a, and having a small diameter of the same size as the inside diameter of the sleeve 10.

In the operation of the apparatus, the piston rod 17 being in its raised or retracted position, a sleeve 10 is mounted in the recess 21 of the work support 20, the guide 23, preferably with its tapered portion 23a suitably lubricated, is mounted upon the upper end of the sleeve 10, and the assembly comprising the sleeve 11 and rubber collar 12ᵃ is mounted in the upper end of the guide 23, as clearly shown in Figure 1. The upper end of the cylinder 16 is then charged to project the piston rod 17 downwardly whereby it engages the upper end of the sleeve 11 and forces the sleeve into telescoped engagement with the sleeve 10, the rubber collar 12ᵃ being thereby deformed and displaced so as completely to fill the space between the two sleeves, and placed under compression, as previously described.

The vulcanizing of the collar 12ᵃ upon the exterior of the inner sleeve 11 is a relatively simple operation, and also it facilitates the insertion of the collar into the sleeve 10, as does the feature of the convex lateral faces of the collar.

The rubber cushion 12 being under compression, it bears strongly against both inner and outer sleeves, thereby assuring that substantial relative angular movement of the sleeves may be had, against the tension of the rubber cushion, before there is any slippage between the cushion and the sleeves. The pressure of the cushion 12 against the inner sleeve relieves the vulcanized bond therebetween of some of the torque incidental to the use of the joint, and the combination of the bond and friction between the inner sleeve and cushion provides greater resistance to relative movement between said members than is present between the cushion and the outer sleeve 10 where friction alone resists relative angular movement of the said members. Thus when slippage occurs, it is always between the outer sleeve 10 and the rubber cushion 12, and, because of the greater surface area of the sleeve 10 as compared to the sleeve 11, such slippage occurs after greater relative angular movement of the sleeves than would be the case if the cushion was not vulcanized to the inner sleeve 11.

Modification may be resorted to within the scope of the appended claims, which are not limited wholly to the specific construction shown or exact procedure described.

What is claimed is:

1. The method of making oscillating joints which comprises adhesively attaching a collar of resilient material exteriorly to one member of the joint, and then telescoping said member with a circumscribing member of smaller diameter than the collar whereby the latter is deformed from its original shape and caused frictionally to engage the circumscribing member and a portion of the member to which it is adhesively attached.

2. The method of making oscillating joints which comprises vulcanizing a collar of rubber onto the inner member of the joint and then telescoping the inner member with an outer member of smaller diameter than the collar whereby the latter is deformed from its original shape and caused frictionally to engage said outer member and a portion of the inner member.

3. The method of making oscillating joints which comprises vulcanizing a collar of rubber onto a tubular sleeve, and then moving the structure thus formed axially into telescoped relation with an outer sleeve of smaller diameter than the rubber collar and concurrently deforming the latter so that it has frictional engagement with the inner sleeve in addition to its vulcanized attachment thereto.

4. The method of forming a rubber articulated joint consisting of inner and outer metallic members interconnected by a sleeve of live rubber which comprises surrounding the inner metallic member with a relatively short sleeve of rubber, vulcanizing the inner surface of said sleeve to said inner member, radially compressing and elongating said sleeve sufficiently to provide an area of frictional contact between said sleeve and inner member on at least one side of the vulcanized area and inserting the assembled sleeve and inner metallic member within said outer member.

5. The method of forming a rubber articulated joint consisting of inner and outer metallic members which comprises surrounding the inner metallic member with a relatively short sleeve of uncured rubber, vulcanizing said sleeve to said inner metallic member and at the same time curing said sleeve, thereafter forcing the assembled inner metallic member and vulcanized rubber sleeve into the outer metallic member.

6. The method of forming a rubber articulated joint consisting of inner and outer metallic members interconnected by a sleeve of live rubber which comprises surrounding the inner metallic member with a relatively short sleeve of uncured rubber, vulcanizing said sleeve to said inner metallic member and at the same time curing said sleeve, thereafter subjecting said sleeve to substantial elongation by means of radial compression and inserting the assembled sleeve and inner member within said outer member.

7. The method of forming a rubber articulated joint consisting of inner and outer metallic members interconnected by a sleeve of live rubber which comprises an initial assembly of a rubber annulus with at least one of said members, the establishment by vulcanizing of a bond between the said annulus and the said member, and thereafter radially compressing and elongating said sleeve sufficiently to provide an area of frictional contact between said sleeve and the member to which it has been bonded by vulcanizing, which area of frictional contact extends axially beyond the vulcanized area on at least one side thereof.

ISAAC W. ROBERTSON.